US007556112B2

(12) United States Patent
Suzuki et al.

(10) Patent No.: US 7,556,112 B2
(45) Date of Patent: Jul. 7, 2009

(54) IN-WHEEL MOTOR SYSTEM

(75) Inventors: Yasuhiro Suzuki, Tokyo (JP); Katsumi Tashiro, Katsumi (JP); Hisashi Kurokawa, Tokyo (JP); Yoshinari Nakamura, Tokyo (JP)

(73) Assignees: Kabushiki Kaisha Bridgestone, Tokyo (JP); Kayaba Industry Co., Ltd., Tokyo (JP)

( * ) Notice: Subject to any disclaimer, the term of this patent is extended or adjusted under 35 U.S.C. 154(b) by 310 days.

(21) Appl. No.: 11/547,262

(22) PCT Filed: Apr. 4, 2005

(86) PCT No.: PCT/JP2005/006616

§ 371 (c)(1),
(2), (4) Date: Oct. 4, 2006

(87) PCT Pub. No.: WO2005/097533

PCT Pub. Date: Oct. 20, 2005

(65) Prior Publication Data

US 2007/0199750 A1 Aug. 30, 2007

(30) Foreign Application Priority Data

Apr. 5, 2004 (JP) ............................. 2004-111516

(51) Int. Cl.
*B60L 8/00* (2006.01)
*B60K 1/00* (2006.01)

(52) U.S. Cl. ...................... 180/65.51; 310/90; 301/6.91

(58) Field of Classification Search ................ 180/19.3, 180/385, 348, 65.1, 65.51; 301/6.91, 136, 301/6.1, 6.15; 310/67 R, 75 R, 154.05, 179, 310/156.37, 90
See application file for complete search history.

(56) References Cited

U.S. PATENT DOCUMENTS 2,537,479 A * 1/1951 Motte ......................... 180/385
3,566,165 A * 2/1971 Lohr .......................... 310/67 R
4,991,698 A * 2/1991 Hanson ....................... 301/6.91

(Continued)

FOREIGN PATENT DOCUMENTS

EP 1 702 784 A1 9/2006

(Continued)

*Primary Examiner*—Hau V Phan
(74) *Attorney, Agent, or Firm*—Sughrue Mion, PLLC (57) ABSTRACT

An in-wheel motor system, wherein the non-rotating side case of a motor and a knuckle are connected to each other by a motor attachment plate (11), a knuckle attachment place (12), and a damper (16) for interconnecting these plates (11) and (12), moving in the vertical direction of a vehicle. A first direct-acting guide (13) consisting of a linear bearing (13A) and a rod (13B) and a second direct-acting guide (14) consisting of a linear bearing (14A) and a rod (14B) are integrally attached to an attachment member (12m) installed on the side face of the knuckle attachment plate (12). Also, spring members (15) and (15) are installed between receiving members (11m) and (11m) for supporting both ends of the rod (14B) of the second direct-acting guide (14) installed on the motor attachment plate (11) and the fixing portion (12k) for fixing the second direct-acting guide 14 of the attachment member (12m). Thus, the rigidity of a buffer mechanism float mounting the in-wheel motor to a part around the wheel of the vehicle can be increased.

5 Claims, 6 Drawing Sheets

U.S. PATENT DOCUMENTS

| | | | |
|---|---|---|---|
| 5,468,055 A * | 11/1995 | Simon et al. | 301/6.91 |
| 5,927,414 A * | 7/1999 | Kan et al. | 180/19.3 |
| 6,011,337 A * | 1/2000 | Lin et al. | 310/156.37 |
| 6,364,078 B1 * | 4/2002 | Parison et al. | 301/136 |
| 6,664,692 B1 * | 12/2003 | Kristoffersen | 310/179 |
| 7,121,367 B2 * | 10/2006 | Ajiro et al. | 180/65.5 |
| 7,306,065 B2 * | 12/2007 | Nagaya | 180/65.5 |
| 2005/0247496 A1 | 11/2005 | Nagaya | |
| 2007/0144801 A1 | 6/2007 | Suzuki et al. | |

FOREIGN PATENT DOCUMENTS

| | | |
|---|---|---|
| WO | 2004/020236 A1 | 3/2004 |
| WO | 2005/061257 A1 | 7/2005 |

* cited by examiner

IN-WHEEL MOTOR SYSTEM

BACKGROUND OF THE INVENTION

1. Field of the Invention

The present invention relates to an in-wheel motor system for use in a vehicle having direct drive wheels as drive wheels.

2. Description of the Prior Art

It is generally known that, in a vehicle having a suspension mechanism such as a spring around a wheel, as the mass of parts under the spring such as a wheel, knuckle and suspension arm, so-called "unsprung mass" increases, changes in the ground holding force of a tire when running on an uneven road become larger, thereby deteriorating road holding properties.

In a vehicle driven by a motor such as an electric car, an in-wheel motor system for incorporating a motor in a wheel is being employed. However, in a conventional in-wheel motor which is fixed to a spindle shaft connected to a part such as an upright or knuckle which is one of the parts around a wheel of the vehicle, as the motor rotor and the wheel can turn, the above unsprung mass increases by the weight of the in-wheel motor, whereby changes in the ground holding force of the tire become large, thereby deteriorating road holding properties (refer to patent documents 1 to 3, for example).

Figure 6:
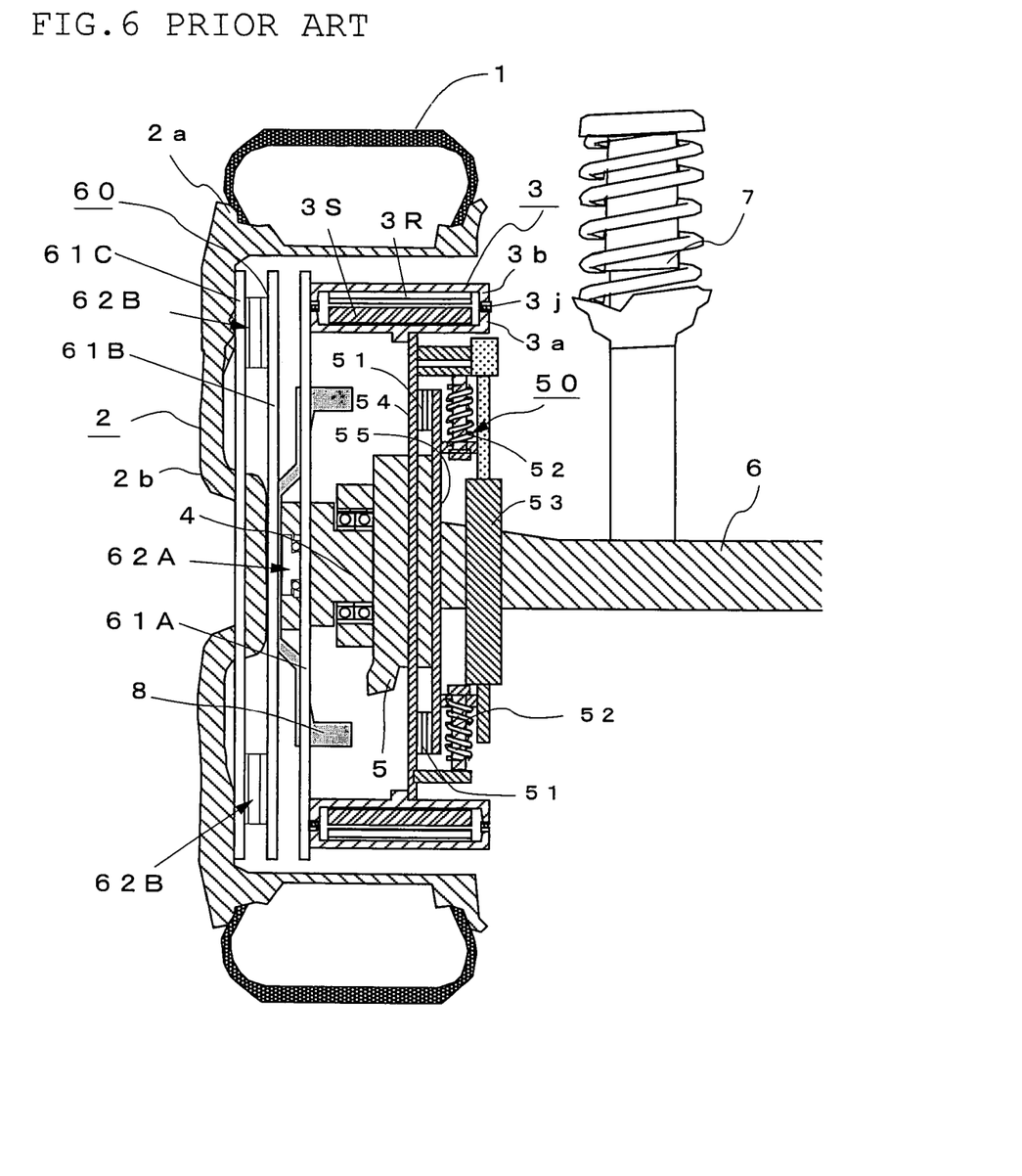
FIG. 6 is a diagram showing the constitution of an in-wheel motor of the prior art.

To solve the above problem, there is proposed an in-wheel motor system as shown in FIG. 6 in which a non-rotating side case $3a$ supporting a stator $3S$ is elastically supported to a knuckle 5 by a buffer mechanism 50 having two plates 54 and 55 whose moving directions are limited to the vertical direction of a vehicle by direct-acting guides 51 and which are interconnected by springs 52 and a damper 53 moving in the vertical direction of the vehicle, and a rotating side case $3b$ supporting a rotor $3R$ and a wheel 2 are interconnected by a flexible coupling 60 comprising a plurality of hollow disk-like plates 61A to 61C which are interconnected by direct-acting guides 62A and 62B arranged in such a manner that their moving directions are orthogonal to each other (refer to patent document 4, for example).

Figure 7:
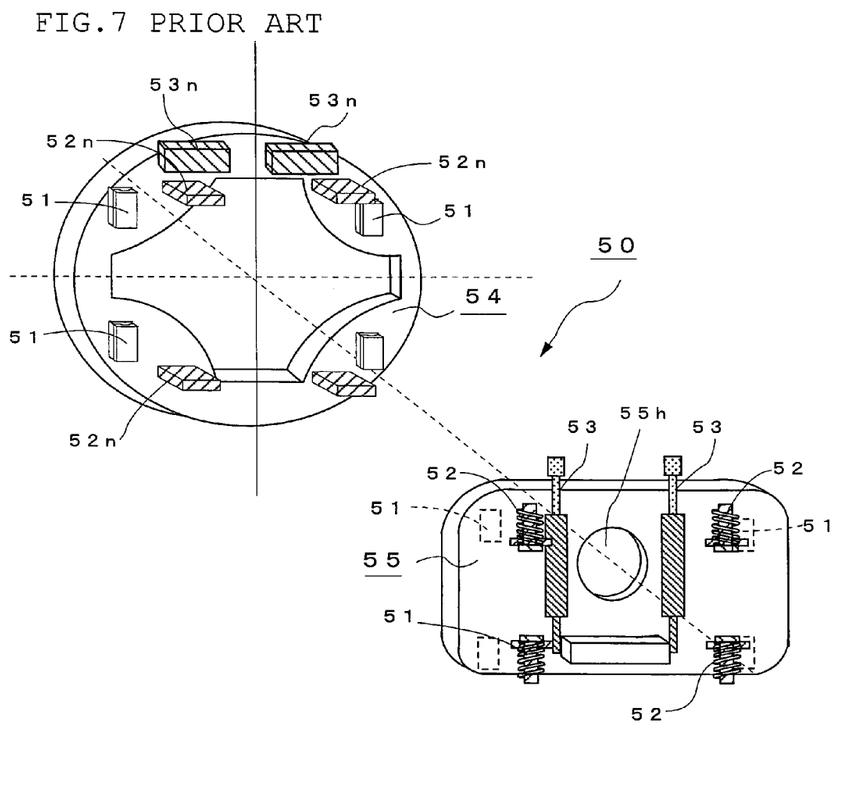
FIG. 7 is a diagram showing the constitution of a buffer mechanism of the prior art.

More specifically, as shown in FIG. 7, the above buffer mechanism 50 is connected to an axle 6 connected to the knuckle 5, four springs 52 which expand and contract in the vertical direction of the vehicle are installed in the four corners of the knuckle attachment plate 55 positioned on the suspension member 7 side, two dampers 53 which expand and contract in the vertical direction of the vehicle are mounted on both sides of a connection hole $55h$ for the axle 6 formed in the center of the knuckle attachment plate 55, spring receivers $52n$ are installed at positions corresponding to positions above or below the above springs 52 of the motor attachment plate 54 positioned on the motor 3 side, damper attachment portions $53n$ are mounted at positions corresponding to positions above the dampers 53, and the above plates 54 and 55 are interconnected by four direct-acting guides 51 which are arranged symmetrical to the centers of the plates. Thereby, the motor attachment plate 54 and the knuckle attachment plate 55 are guided in the vertical direction of the vehicle by the above four direct-acting guides 51 and interconnected by the springs 52 and the dampers 53, thereby making it possible to limit the movement of the in-wheel motor 3 to the vertical direction while attenuation force is generated.

In the in-wheel motor system constituted as described above, the motor 3 is float mounted to a part around the wheel so that the motor 3 itself can be used as the weight of a dynamic damper, thereby making it possible to improve ground holding performance and riding comfort when running on a bad road. Since the motor shaft and the wheel shaft are interconnected by the above flexible coupling 60 in such a manner that they can become eccentric to each other in any direction, torque can be transmitted from the motor 3 to the wheel 2 efficiently.

Patent document 1: Japanese Patent No. 2676025

Patent document 2: Japanese Examined Patent Publication No. 9-506236

Patent document 3: Japanese Unexamined Patent Application No. 10-305735

Patent document 4: WO 02/083446 A1

SUMMARY OF THE INVENTION

Although the above buffer mechanism 50 can float mount the motor 3 to a part around the wheel of the vehicle without fail, it has a large number of parts and requires high assembly accuracy because the four direct-acting guides 51 and the springs 52 must be mounted in parallel to each other in the vertical direction. Therefore, assembly work takes long.

Figure 8:
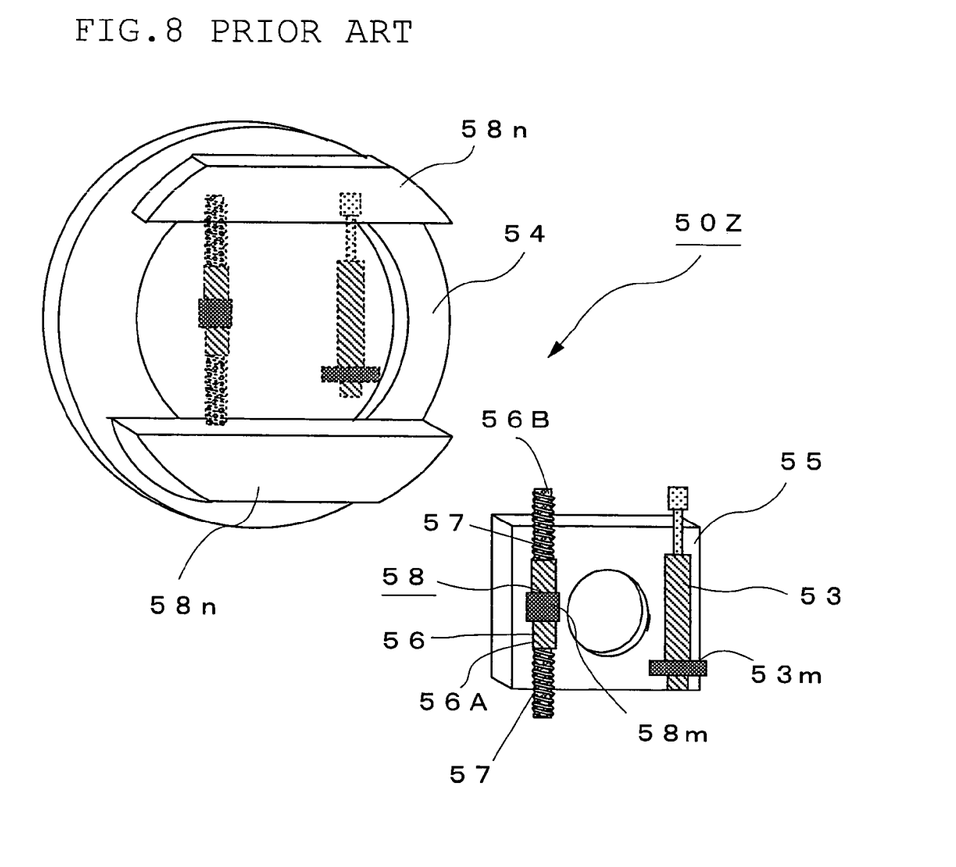
FIG. 8 is a diagram showing the constitution of a buffer mechanism comprising a direct-acting guide with a spring.

To solve the above problem, the present applicant proposes an in-wheel motor system in which the non-rotating side case $3a$ of the motor and the knuckle 5 are interconnected by a buffer mechanism 50Z comprising plates 54 and 55, which are interconnected by a direct-acting guide 58 with a spring composed of a direct-acting guide 56 comprising a linear bearing 56A and a rod 56B and spring members 57 and 57 moving in the vertical direction of the vehicle, and a damper 53 for interconnecting the above plates 54 and 55, moving in the vertical direction of the vehicle as shown in FIG. 8 (JP-A 2003-425668). In FIG. 8, reference symbol $58n$ denotes a receiving member for the direct-acting guide 58 or the direct-acting guide 58 and the damper 53, and $58m$ and $53m$ represent fixing members for the direct-acting guide 58 and the damper 53, respectively. Thereby, the in-wheel motor can be float mounted to a part around the wheel of the vehicle by a buffer mechanism having a simple structure and a small number of parts, thereby making it possible to improve productivity and manufacture the in-wheel motor at a low cost.

It is an object of the present invention to provide an in-wheel motor system comprising a buffer mechanism which is an improved version of the above buffer mechanism having a direct-acting guide with a spring, has high rigidity and can float mount the motor to a part around the wheel of the vehicle more reliably.

According to a first aspect of the present invention, there is provided an in-wheel motor system in which the stator side of a hollow direct drive motor provided on a wheel is supported to a part around the wheel of a vehicle by an elastic body and/or an attenuation mechanism, comprising:

a motor side plate connected to the non-rotating side case of the motor;

a knuckle side plate arranged coaxially to the motor side plate and connected to a knuckle;

a buffer mechanism for interconnecting the motor side plate and the knuckle side plate, which moves in the vertical direction of the vehicle;

a first direct-acting guide comprising a linear bearing and a rod and attached to the knuckle side plate;

a fixing member projecting from the first direct-acting guide or the knuckle side plate;

a second direct-acting guide which is attached to the fixing member, conprises a linear bearing and a rod, and moves in the same direction as the first direct-acting guide;

receiving members for attaching the both ends of the first and second direct-acting guides to the motor side plate; and spring members interposed between the fixing member for fixing the first and second direct-acting guides and the receiving members.

According to a second aspect of the present invention, there is provided an in-wheel motor system in which the stator side of a hollow direct drive motor provided on a wheel is supported to a part around the wheel of a vehicle by an elastic body and/or an attenuation mechanism, comprising:

a motor side plate connected to the non-rotating side case of the motor;

a knuckle side plate arranged coaxially to the motor side plate and connected to a knuckle;

a buffer mechanism for interconnecting the motor side plate and the knuckle side plate, which moves in the vertical direction of the vehicle;

a first direct-acting guide comprising a linear bearing and a rod and attached to the knuckle side plate;

receiving members for attaching the both ends of the first direct-acting guide to the motor side plate;

a second direct-acting guide which comprises a linear bearing and a rod, is arranged besides the first direct-acting guide, and moves in the same direction as the first direct-acting guide;

receiving members for connecting the both ends of the second direct-acting guide to the motor side plate;

a fixing member for interconnecting the housings of the linear bearings of the first and second direct-acting guides to integrally fix them; and spring members interposed between the fixing member and the receiving members.

According to a third aspect of the present invention, there is provided an in-wheel motor system, wherein the first direct-acting guide is installed on the side face in the front-and-rear direction of the tire of the knuckle side plate.

According to a fourth aspect of the present invention, there is provided an in-wheel motor system, wherein the first and second direct-acting guides are integrally attached to an attachment member mounted to the knuckle side plate.

According to a fifth aspect of the present invention, there is provided an in-wheel motor system, wherein the two direct-acting guides are arranged side by side on the rear side of the vehicle in the cross direction of the wheel.

According to the present invention, the non-rotating side case of the motor and the knuckle are interconnected by the buffer mechanism comprising the motor side plate connected to the non-rotating side case of the motor, the knuckle side plate connected to the knuckle and a damper for interconnecting these plates, moving in the vertical direction of the vehicle, the first direct-acting guide comprising a linear bearing and a rod is attached to the knuckle side plate, the second direct-acting guide similar in structure to the first direct-acting guide is attached to the knuckle side plate or the fixing member projecting from the first direct-acting guide, or the housings of the linear bearings of the first and second direct-acting guides are integrally interconnected and fixed to the fixing member to attach the above first and second direct-acting guides to the knuckle attachment plate, and further the spring members are interposed between the fixing member and the receiving members for accepting the both ends of the above first or second direct-acting guide mounted to the motor side plate to limit the movements in the vertical direction of the vehicle of the motor side plate and the knuckle side plate by the first and second direct-acting guides. Consequently, the rigidity of the buffer mechanism can be improved and the in-wheel motor can be float mounted to a part around the wheel of the vehicle without fail.

Since the buffer mechanism comprising the above first and second direct-acting guides and the spring members has a small number of parts and is easily assembled, productivity can be improved.

DETAILED DESCRIPTION OF THE PREFERRED EMBODIMENTS

Preferred embodiments of the present invention will be described hereinunder with reference to the accompanying drawings.

Figure 1:
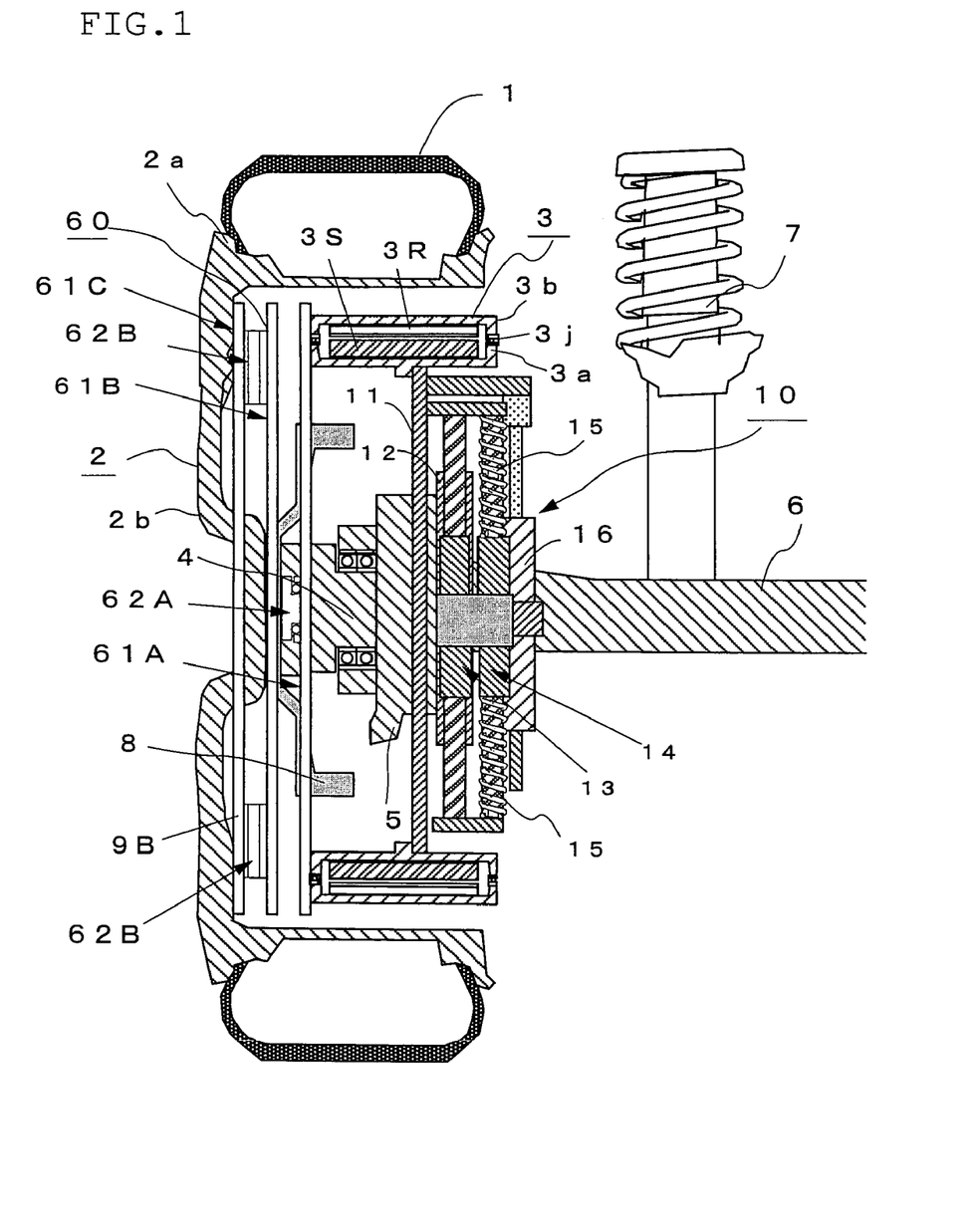
FIG. 1 is a longitudinal sectional view of an in-wheel motor system according to an embodiment of the present invention.

FIG. 1 shows the constitution of an in-wheel motor system according to a preferred embodiment of the present invention. In FIG. 1, reference numeral 1 denotes a tire, 2 a wheel comprising a rim 2a and a wheel disk 2b, and 3 an outer rotor type in-wheel motor which comprises a stator 3S fixed to a non-rotating side case 3a arranged on the inner side in the radial direction and a rotor 3R fixed to a rotating side case 3b rotatably connected to the above non-rotating side case 3a through a bearing 3j and arranged on the outer side in the radial direction.

Numeral 4 denotes a hub connected to the wheel 2 at its rotary shaft, 5 a knuckle connected to an axle 6, 7 a suspension member composed of a shock absorber, 8 a brake unit composed of a brake disk mounted to the above hub 4, 10 a buffer mechanism for connecting the non-rotating side case 3a of the motor to the knuckle 5, comprising first and second direct-acting guide members 13 and 14 for guiding a motor attachment plate 11 connected to the non-rotating side case 3a of the motor 3 and a knuckle attachment plate 12 attached to the above axle 6, spring members 15 and 15 which are attached to the second direct-acting guide 14 and expand and contract in the moving direction of the second direct-acting guide 14, and a single rod type damper 16 which expands and contracts in the moving direction of the first and second direct-acting guides 13 and 14, and 60 a flexible coupling for connecting the motor 3 to the wheel 2, comprising a plurality of hollow disk-like plates 61A to 61C and direct-acting guides 62A and 62B for interconnecting the above plates 61A to 61C, arranged in such a manner that their moving directions are orthogonal to each other.

In this embodiment, for the easy understanding of the constitution of the buffer mechanism 10, the positions of the motor attachment plate 11 and the knuckle attachment plate 12 and the positions of the direct-acting guides 13 and 14 and the damper 16 are shifted in the axial direction.

Figure 2:
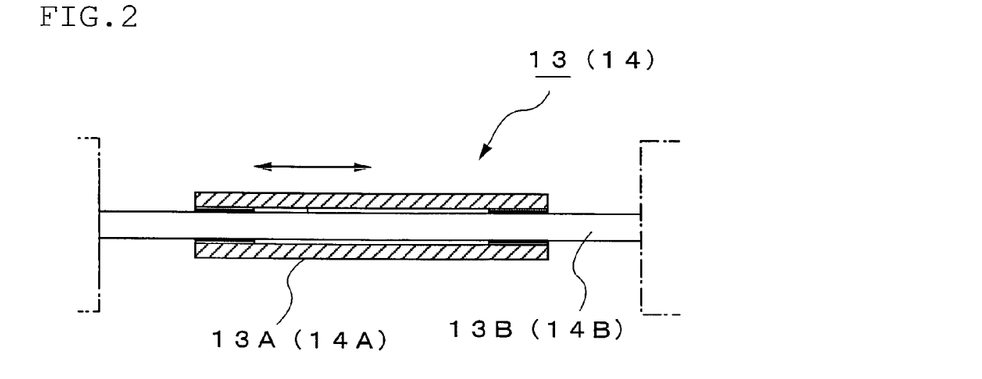
FIG. 2 is a diagram showing the constitution of direct-acting guides according to the embodiment of the present invention.
Figure 3:
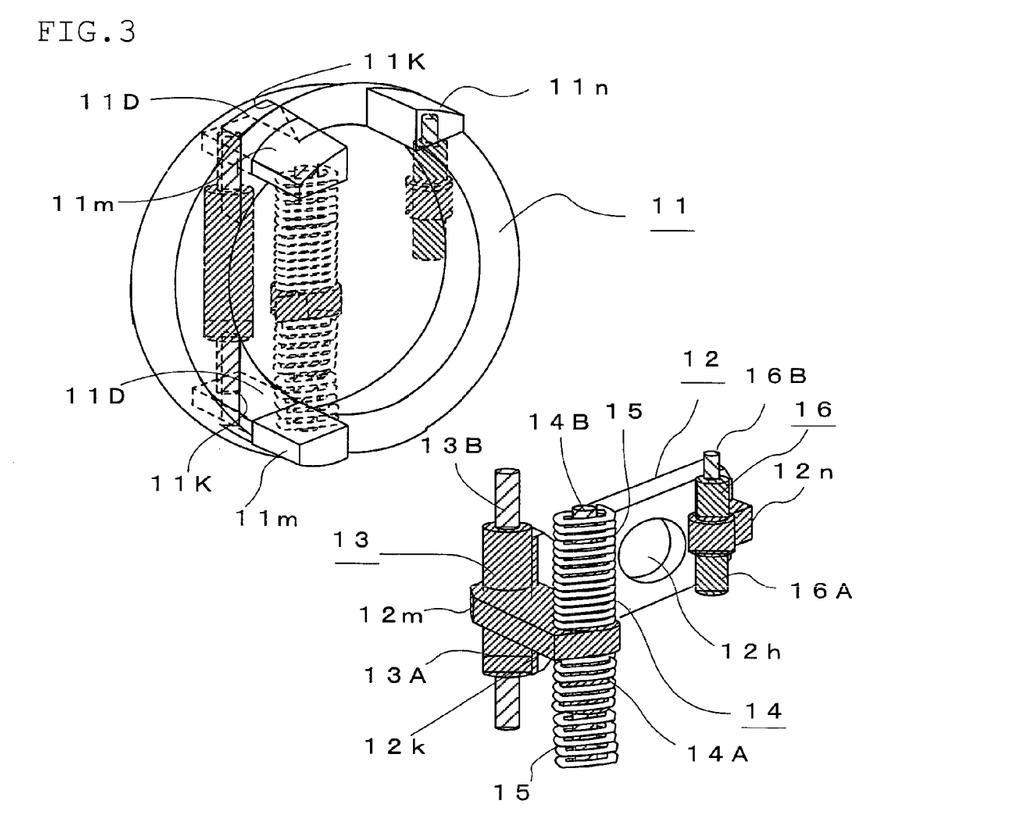
FIG. 3 is a diagram showing the constitution of a buffer mechanism according to the embodiment of the present invention.

As shown in FIG. 2, the first and second direct-acting guides 13 and 14 are each composed of a linear bearing 13A (14A) and a rod 13B (14B) which is fitted in the linear bearing 13A (14A) and moves linearly. In this embodiment, as shown in FIG. 3, an attachment member 12m is installed on the side face in the tire cross direction of the knuckle attachment plate 12 having a connection hole 12h for the unshown axle 6, and the first and second direct-acting guides 13 and 14 are integrally attached to the attachment member 12m. This attachment member 12m has a fixing portion 12k for fixing the center portion of the above second direct-acting guide 14, which supports the above first direct-acting guide 13 along almost the entire length of the linear bearing 13A constituting the above first direct-acting guide 13 and projects toward the suspension member 7 from around the center portion of the above first direct-acting guide 13. The above second direct-acting guide 14 is attached to the fixing portion 12k, and the fixing portion 16A of the above damper 16 is attached to a fixing member 12n provided on the other side of the above connection hole 12h.

Receiving members 11m and 11m are installed at positions corresponding to the both end portions of the rods 13B and 14B which are movable portions of the first and second direct-acting guides 13 and 14 of the motor attachment plate 11 situated on the motor 3 side, the both end portions of the above rods 13B and 14b are connected to the receiving members 11m and 11m, and the spring members 15 and 15 are interposed between the sides receiving the both end portions of the above rods 14B of the above receiving members 11m and the fixing portion 12k. A receiving member 11n for the damper is provided on the above motor attachment plate 11 to attach the top end of the rod 16B which is a movable portion of the damper 16 to the receiving member 11n.

Thereby, the motor attachment plate 11 and the knuckle attachment plate 12 are guided in the vertical direction of the vehicle by the above first and second direct-acting guides 13 and 14 and elastically connected to each other by the spring members 15 and 15 fitted onto the above second direct-acting guide 14 and the above damper 16. Therefore, the in-wheel motor 3 can be moved only in the vertical direction while generating attenuation force.

In this embodiment, to reduce the thickness of the buffer mechanism 10, as shown in FIG. 3, notches 11K and 11K are formed in the motor attachment plate 11, and receiving member attachment pieces 11D and 11D for attaching the receiving members 11m and 11m of the above rods 13B and 14B are installed in the notches 11K and 11K to attach the above receiving members 11m and 11m, respectively. That is, when both of the two direct-acting guides are arranged in the cross direction of the wheel 2, the projection amounts of the receiving members 11m and 11m and the thickness of the buffer mechanism 10 increase and also the distance between the direct-acting guide (second direct-acting guide 14) on the suspension member 7 side and the motor attachment plate 11 becomes long. Therefore, to guide the motor attachment plate 11 and the knuckle attachment plate 12 in the vertical direction of the vehicle stably, strength must be ensured by increasing the thickness of the above receiving members 11m and 11m. In contrast to this, in this embodiment, parts of the receiving members 11m and 11m are built in the motor attachment plate 11, whereby the motor attachment plate 11 and the knuckle attachment plate 12 can be guided in the vertical direction of the vehicle reliably without increasing the thickness of the buffer mechanism 10.

Further, in this embodiment, the non-rotating side case 3a of the motor is supported by the first and second direct-acting guides 13 and 14 to achieve higher rigidity than when there is only one direct-acting guide as described above, thereby making it possible to float mount the in-wheel motor 3 to a part around the wheel of the vehicle more reliably. In addition, although one direct-acting guide (second direct-acting guide 14) is connected to the knuckle attachment plate 12 only by the fixing portion 12k like the direct-acting guide 58 with a spring shown in FIG. 8, since the other direct-acting guide (first direct-acting guide 13) is attached to the knuckle attachment plate 12 along almost the entire length of the linear bearing 13A, the rigidity of the buffer mechanism 10 can be increased as compared with a case where two of the above direct-acting guides 58 with a spring are installed. When the spring members 15 and 15 are attached to only one of the direct-acting guides, they can exhibit their effect fully.

Figure 4:
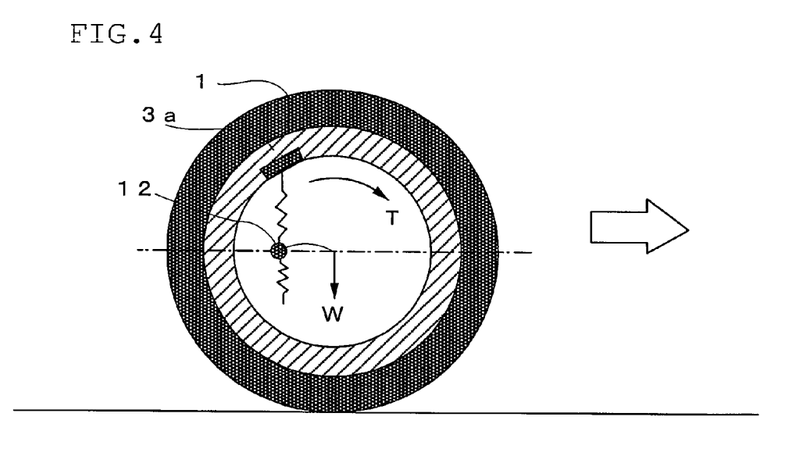
FIG. 4 is a diagram showing the relationship between the installation position of the direct-acting guides according to the embodiment of the present invention and torque applied to the motor.

In this embodiment, the first and second direct-acting guides 13 and 14 are arranged on the rear side of the vehicle. Therefore, when the vehicle stops, as shown in FIG. 4, torque T for rolling the wheel in the traveling direction is applied to the motor 3. When the vehicle starts to move, drive reaction force is generated in the motor 3 in a direction opposite to the above torque T and cancels out the torque T, thereby making possible smooth guide slide. Consequently, the above first and second direct-acting guides 13 and 14 are preferably arranged on the rear side in the traveling direction of the vehicle.

Not only at the time of acceleration but also at the time of traveling, when the rotor 3R turns in the traveling direction of the vehicle, drive reaction force is generated in the stator 3S of the in-wheel motor 3 in the opposite direction (rear direction of the vehicle). Since this drive reaction force is supported by the above direct-acting guides 13 and 14, when the above direct-acting guides 13 and 14 are arranged on the rear side of the vehicle, even at the time of running, the torque T of the motor 3 applied to the direct-acting guides 13 and 14 balances with the above drive reaction force, whereby slidability between the rods 13B and 14B and the linear bearings 13A and 14A is improved and the motor 3 can be guided smoothly in the vertical direction.

According to this embodiment, the non-rotating side case 3a of the motor 3 and the knuckle 5 are interconnected by the motor attachment plate 11, the knuckle attachment plate 12 and the damper 16 for interconnecting these plates 11 and 12, which moves in the vertical direction of the vehicle, the first direct-acting guide 13 comprising the linear bearing 13A and the rod 13B and the second direct-acting guide 14 comprising the linear bearing 14A and the rod 14B are attached integrally to the attachment member 12m provided on the side face of the knuckle attachment plate 12, the spring members 15 and 15 are interposed between the receiving members 11m and 11m for supporting the both ends of the rod 14B of the above second direct-acting guide 14, provided on the above motor attachment plate 11, and the fixing portion 12k for fixing the second direct-acting guide 14 of the above attachment member 12m, and the movements in the vertical direction of the vehicle of the above motor attachment plate 11 and the knuckle attachment plate 12 are limited. Therefore, the rigidity of the buffer mechanism 10 can be increased and the in-wheel motor can be float mounted to a part around the wheel of the vehicle more reliably.

Figure 5A:
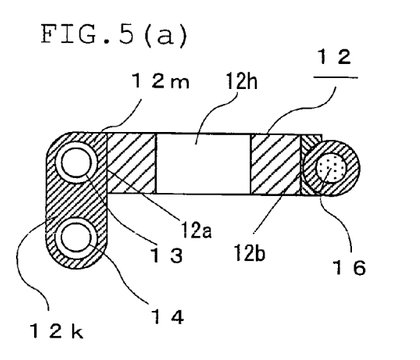
FIGS. 5(a) and 5(b) are diagrams showing other methods of installing the direct-acting guides.
Figure 5B:
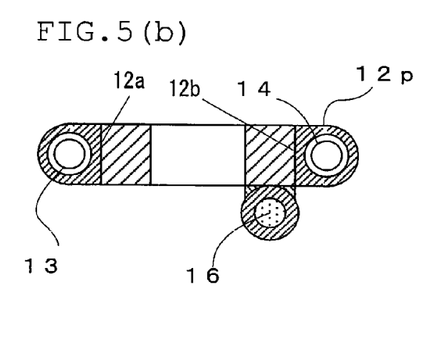

In the above embodiment, the damper 16 is arranged on the suspension member 7 side of the knuckle attachment plate 12. As shown in FIG. 5(a), it may be installed on the side face 12b opposed to the face 12a to which the first direct-acting guide 13 is attached. Or, as shown in FIG. 5(*b*), a fixing piece 12p may be projected from the above side face 12b and the second direct-acting guide 14 may be fixed in this fixing piece 12p. When the starting properties of the vehicle are taken into consideration, like this embodiment, the first and second direct-acting guides 13 and 14 are preferably arranged side by side on the rear side of the vehicle in the cross direction of the wheel 2.

Not only the above single rod type damper but also a known damper which expands and contracts in one direction may be used as the damper 16.

INDUSTRIAL FEASIBILITY

As having been described above, according to the present invention, as the in-wheel motor is float mounted to a part around the wheel of the vehicle reliably, ground holding performance and riding comfort when running on a bad road can be further improved. Since the buffer mechanism of the present invention is simple in structure and has a small number of parts, productivity can be improved and the in-wheel motor can be manufactured at a low cost.

What is claimed is:

1. An in-wheel motor system in which a stator side of a hollow direct drive motor provided on a wheel is supported to a part around the wheel of a vehicle by at least one of an elastic body and an attenuation mechanism, comprising:
    a motor side plate connected to a non-rotating side case of the motor;
    a knuckle side plate arranged coaxially to the motor side plate and connected to a knuckle;
    a buffer mechanism for interconnecting the motor side plate and the knuckle side plate, which moves in the vertical direction of the vehicle;
    a first direct-acting guide comprising a linear bearing and a rod and attached to the knuckle side plate;
    a fixing member projecting from the first direct-acting guide or the knuckle side plate;
    a second direct-acting guide which is attached to the fixing member, comprising a linear bearing and a rod, and moves in the same direction as the first direct-acting guide;
    receiving members for attaching the both ends of the first and second direct-acting guides to the motor side plate; and
    spring members interposed between the fixing member for fixing the first and second direct-acting guides and the receiving members.

2. The in-wheel motor system according to claim 1, wherein the first direct-acting guide is installed on the side face in the front-and-rear direction of the tire of the knuckle side plate.

3. The in-wheel motor system according to claim 1, wherein the first and second direct-acting guides are integrally attached to an attachment member mounted to the knuckle side plate.

4. The in-wheel motor system according to claim 1, wherein the two direct-acting guides are arranged side by side on the rear side of the vehicle in the cross direction of the wheel.

5. An in-wheel motor system in which a stator side of a hollow direct drive motor provided on a wheel is supported to a part around the wheel of a vehicle by at least one of an elastic body and an attenuation mechanism, comprising:
    a motor side plate connected to a non-rotating side case of the motor;
    a knuckle side plate arranged coaxially to the motor side plate and connected to a knuckle;
    a buffer mechanism for interconnecting the motor side plate and the knuckle side plate, which moves in the vertical direction of the vehicle;
    a first direct-acting guide comprising a linear bearing and a rod and attached to the knuckle side plate;
    receiving members for attaching the both ends of the first direct-acting guide to the motor side plate;
    a second direct-acting guide which comprises a linear bearing and a rod, is arranged besides the first direct-acting guide, and moves in the same direction as the first direct-acting guide;
    receiving members for connecting the both ends of the second direct-acting guide to the motor side plate;
    a fixing member for interconnecting the housings of the linear bearings of the first and second direct-acting guides to integrally fix them; and
    spring members interposed between the fixing member and the receiving members.

* * * * *